United States Patent Office 2,841,517
Patented July 1, 1958

2,841,517

PHOSPHOROTHIOLIC ACID ESTER COMPOSITIONS AND METHODS OF DESTROYING INSECTS

William R. Boon and Eric C. Edgar, Bracknell, Ranajit Ghosh and Norman Greenhalgh, Manchester, Hans S. Hopf, Bracknell, and Betty Florence Burnand, Richmond, England, assignors to Imperial Chemical Industries Limited, London, England, a corporation of Great Britain No Drawing. Application January 10, 1955
Serial No. 481,032

Claims priority, application Great Britain
December 22, 1954

9 Claims. (Cl. 167—22)

This invention relates to new pesticidal compositions containing a phosphorus ester, as more particularly defined below and a carrier and if desired an auxiliary agent and/or a plant nutrient.

The new compositions are useful against pests of the order Acarina, particularly the tetranychids or plant-feeding mites, and also against scale insects, e. g. *Aonidiella aurantii* mask, i. e. the Californian red scale. They are also toxic to some other plant pests, including aphids, e. g. *Macrosiphum pisi*, *Aphis gossypii* and *Rhopolosiphium prunifoliae*, and caterpillars e. g. *Plutella maculipennis* Curtis. Despite the high toxicity of these compositions to such insects, they nevertheless show remarkable selective toxicity. They are only slightly toxic to some insects, including *Tribolium castaneum* *Dysdercus fasciatus*, *Micraspis sexdecimpunctata* and *Locusta migratoria*.

They may be in form suitable for direct application or in concentrated form suitable for application after dilution.

The said esters are phosphorothiolic acid esters of the general formula:

$$O=P(OR_1)(OR_2)-S-LX$$

in which $R_1$ and $R_2$ stand for like or unlike alkyl radicals, L stands for a saturated straight or branched chain aliphatic hydrocarbon radical or for such a radical in which the carbon atoms are interrupted by an oxygen or sulfur atom or by a nitrogen atom carrying an alkyl substituent, and X stands for a secondary aliphatic or heterocyclic amine attached to L through the amino nritogen atom or for a salt of such aliphatic or heterocyclic amine. Preferred esters are those which nowhere contain a hydrocarbon radical with more than 4 carbon atoms. The esters in which X stands for a secondary aliphatic or heterocyclic amine may be made by the methods of copending U. S. application Serial No. 391,121, filed November 9, 1953, and may be converted to salts in the ordinary ways.

Although, as will be shown more fully below the simplest compositions of the invention consist only of very dilute aqueous solutions of suitable esters or their salts and we anticipate that such solutions or slight modifications of them will find wide application, nevertheless we include in our invention, as indicated above, compositions which contain carriers other than water, compositions which contain auxiliary agents and compositions which contain plant nutrients as well as compositions which contain two or more of those ingredients in addition to the ester or esters. Carriers, auxiliary agents and plant nutrients do not comprise completely independent categories as substances can be used which act in two of these categories.

The carriers may be liquids or solids. As liquids there may be used water, as already mentioned, and non-phytocidal organic solvents. These liquids may be used for both for compositions for direct application and for compositions in concentrated form suitable for use after dilution. Solid carriers include inert pulverulent diluents, e. g. talc, kieselguhr, bentonite and other colloidal clays and powdered chalk. These carriers are used almost entirely for making pulverulent preparations for direct application. For concentrated solid preparations there may be used other solid carriers and more particularly water-soluble organic and inorganic compounds; with these the toxic ingredient may be incorporated to give a shaped tablet or block or a non-hygroscopic free-flowing granular preparation. Solids which have auxiliary or plant-nutrient properties can, in suitable cases, be used as carriers.

As auxiliary agents we mean substances other than carriers which assist in the preparation and handling of the compositions or in their application or which increase their effectiveness. Such auxiliary agents comprise a miscellany of substances. Thus in making pulverulent compositions, dust-binding agents such as spindle oil, glycerol and wool fat may be used. Wetting, spreading and dispersing agents such as sodium dinaphthylmethane disulphonate and sodium lauryl sulphate and substances adapted to promote adhesion or so-called sticking agents, such as glue and resin, may be used especially in liquid preparations. Plant nutrients, i. e. nutrients which are applied directly to the leaves or other above-ground portions of the plant as distinct from fertilisers which are applied indirectly to the plant through the ground (and which are coming into increasing use) include such substances as urea and magnesium sulphate.

Plant nutrients can, we have found, be in corporated into the compositions of this invention and the resulting products can be applied to plants and in this way results which would otherwise need two applications to the plants can be obtained by means of a single application. Moreover certain plant nutrients can in some preparations play the part of carrier. Thus solid preparations may be made consisting of urea and an ester, which can be dissolved in water to yield solutions which can be applied as combined nutritive-pesticidal washes and sprays.

In giving examples of specific carriers, auxiliary agents and plant nutrients and specific types of these as well as specific modes of incorporation, we do this by way of illustration only and not by way of confining the invention to any or all of these.

For most purposes aqueous formulations are not only the most efficacious in action, but also the easiest in application and the most simple in preparation. Moreover the aqueous preparations can in nearly all cases be aqueous solutions, as even with the less soluble esters or salts the solubility is in most cases sufficient to give the very dilute solutions, which are all that are needed for effective action against certain plant-feeding mites and insects.

Consequently the devising of formulations presents little or no difficulty in the present invention.

The invention is of special interest in the control of *Metatetranychus ulmi* and *Tetranychus telarius*, two species of *Tetranychidae* commonly known in England as the fruit tree and glasshouse red spider mites respectively.

During recent years these and other red spider mites have become an increasingly serious economic pest in horticulture and agriculture, on a wide range of crops such as apples, citrus and cotton. It is commonly believed that this is partly due to certain secondary effects of the particular pesticides which have been used. One of these, di-p-chlorophenyltrichloroethane, although slightly toxic to red spider mites, is much more toxic to their main predators which under normal conditions often exert a high degree of control on the red spider mites. Another one, namely diethyl p-nitrophenyl thiophosphate (parathion), is like certain other organo-phosphorus compounds, highly toxic to red spider mites and has been widely used to treat crops infected with these pests. It is however not toxic to the eggs of the red spider mites nor does its toxic effect persist sufficiently long after application to kill the larvae on hatching from the eggs, and as a result it is a frequent experience for a second infestation of the crop to develop which is much worse than the first.

The esters of the above general formula have the property that while they are highly toxic to red spider mites they are also sufficiently persistent for the larvae to be killed as they hatch from the eggs.

The efficacy of the esters may be illustrated by tests which were carried out on the use of O:O'-diethyl S-β-diethylaminoethyl phosphorothiolate in the control of the glasshouse red spider, *Tetranychus telarius* on French bean plant (*Phaseolus vulgaris*). On these it was examined as a foliage spray for contact and persistence activities and in addition the systemic and leaf-penetrating properties were tested.

The results showed that it was more active than any other acaricide known to us. As a contact spray against adult red spiders it gave a 96% kill when used in the form of an aqueous spray containing only 0.0003% by weight of the ester. At a concentration of 0.0025% the solution when painted on the upper surface of the leaf killed 93% of the adult red spiders on the under surface. Diethyl p-nitrophenyl thiophosphate, a well known insecticide and acaricide hitherto considered active in penetrating leaf tissues, is inactive by comparison. This concentration of 0.0025% will also give a complete kill of adult red spiders on leaves which are artificially infected 7 days after spraying.

As regards its systemic action, when the soil in which French bean plants were growing was watered with a solution of the ester (without wetting the plant) red spider mites on the leaves were killed.

The phytotoxicity of the compound is low. At 100 times the concentration which gave complete kills of red spider no damage was caused either to French bean or to tomato leaves (*Lycopersicum esculentem*).

The compound was also found active as a contact spray against aphids at a concentration of 0.002%.

As red spiders and aphids may occur together both may be destroyed by the same preparation.

Field trials were carried out with O:O'-diethyl S-β-diethylaminoethyl phosphorothiolate hydrogen oxalate,

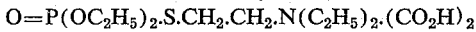

against the fruit tree red spider mite, *Metatetranychus ulmi*, on apple trees. The results were outstandingly good. Almost complete control was obtained throughout the season by one application of a 0.002% by weight aqueous solution in early June (in England). The treated trees were immune to a very severe infestation which developed on neighbouring untreated trees in August and the laying of winter eggs was much reduced. Also large bush apple trees severely infested and carrying a population of over 200 mites and eggs per leaf, were sprayed once with a 0.004% or 0.002% by weight aqueous solutions in August. Four weeks later no living mites could be found on these trees and no winter eggs were subsequently deposited.

An infestation of *Bryobia praetiosa* Koch on a Morello cherry tree was controlled by spraying the tree once with the hydrogen oxalate of O:O'-diethyl S-β-diethylaminoethyl phosphorothiolate in the form of a 0.002% by weight aqueous solution. Californian red scale, *Aonidiella aurantii* Mask, was controlled completely in laboratory tests by sprays containing 0.05% of O:O'-diethyl S-β-diethylaminoethyl phosphorothiolate in aqueous solution. It was also found that when O:O'-diethyl S-β-diethylaminoethyl phosphorothiolate is applied to the roots of pot grown cabbage plants, the larvae of *Plutella maculipennis* Curtis feeding on the leaves of the plants were killed.

The preparations are also efficacious against *Aphis gossypii* on cotton plants and red spider on tea plants.

The following examples in which parts are by weight illustrate but do not limit the invention.

*Example 1*

One part of O:O'-diethyl S-β-diethylaminoethyl phosphorothiolate is dissolved in 2,000 parts of water.

This spray gave 100% kill of *Aonidiella aurantii* Mask (Californian red scale) in the laboratory.

Similarly, 1 part of O-ethyl O'-methyl S-β-diethylaminoethyl phosphorothiolate is dissolved in 50,000 parts of water.

This spray gave a high kill of *Tetranychus telarius* on tomato plants.

*Example 2*

A mixture of 81 parts of O:O'-diethyl S-β-diethylaminoethyl phosphorothiolate and 140 parts of diethyl ether is added to a solution of 51 parts of p-toluenesulphonic acid in 1050 parts of ether. The precipitated p-toluenesulphonate salt of the base is collected by filtration and may be crystallised, if desired, from a mixture of acetone and diethyl ether. It melts at 105° C. This salt is readily soluble in water. As a 0.002% solution it is suitable as an acaricidal spray.

*Example 3*

A mixture of 10 parts of O:O'-diethyl S-β-diethylaminoethyl phosphorothiolate and 20 parts of methanol is added to a solution of 5 parts of oxalic acid dihydrate in 48 parts of methanol.

The resulting solution is concentrated under reduced pressure to give the salt. If a pure product is desired, the salt may be crystallised from acetone to give pure O:O'-diethyl S-β-diethylaminoethyl phosphorothiolate hydrogen oxalate, M. P. 98–99° C. The salt is readily soluble in water to make a spray suitable for application to foliage.

*Example 4*

O:O'-diethyl S-β-diethylaminoethyl dihydrogen citrate, M. P. 94–95° C. is obtained from 108 parts of the base and 84 parts of citric acid following the procedure given under Example 3. A similar preparation is obtainable by dissolving it in water.

*Example 5*

566 parts of O:O'-diethyl S-1-diethylamino-prop-2-yl phosphorothiolate are treated with a solution of 240 parts of oxalic acid dihydrate in 1640 parts of acetone and the mixture kept until precipitation of the salt is substantially complete (about 1½ hours). The solvent is then removed under reduced pressure and the residual oily solid dried on a porous plate. If a pure product is desired, the crude solid may be crystallised from a mixture of acetone and ether to give pure O:O'-diethyl S-1-diethylaminoprop-2-yl phosphorothiolate hydrogen oxalate, M. P. 88.5–89.5° C. The salt is readily soluble in water to make a spray suitable for aplication to foliage.

*Example 6*

562 parts of O:O'-diethyl S-β-piperidinoethyl phosphorothiolate are dissolved in 410 parts of acetone and added to a solution of 252 parts of oxalic acid dihydrate in 1640 parts of acetone. When the precipitation of the salt is substantially complete, the solid is collected by filtration. It may, if desired, be crystallised from a mixture of ethanol and acetone to give pure O:O'-diethyl S-β-piperidinoethyl phosphorothiolate hydrogen oxalate, M. P. 124–125° C. This salt is readily soluble in water to give a solution suitable for use as an agricultural spray.

*Example 7*

566 parts of O:O'-diethyl S-β-morpholinoethyl phosphorothiolate are dissolved in 1400 parts of ether and added to a solution of 344 parts of p-toluene-sulphonic acid in 21,300 parts of ether. The salt which separates is collected by filtration and may, if desired, be crystallised from a mixture of acetone and ether to give pure O:O'-diethyl S-β-morpholinoethyl phosphorothiolate p-toluene-sulphonate, M. P. 122.5–123.5° C. The salt is readily soluble in water to give a solution suitable for use as an agricultural spray.

*Example 8*

594 parts of O:O'-diethyl S-β-di-n-propyl-aminoethyl phosphorothiolate are treated with a solution of 252 parts of oxalic acid dihydrate in 1640 parts of acetone. The solvent is then removed under reduced pressure to give the salt which may be, if desired, crystallised from a mixture of ether and acetone to give pure O:O'-diethyl S-β-di-n-propylaminoethyl phosphorothiolate hydrogen oxalate, M. P. 81–82° C. The salt is readily soluble in water to give a solution which may be used as an agricultural spray.

*Example 9*

One part of O:O'-diethyl S-β-diethylaminoethyl phosphorothiolate dihydrogen citrate

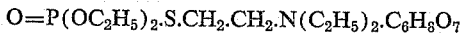

and 640 parts of urea are intimately mixed.

1 part of this mixture is dissolved in 50 parts of water to give a combined acaricidal and nutrient spray.

Alternatively the mixture can be compressed into granules, tablets or briquettes in order to make it more convenient for handling, packaging, storing and measuring.

*Example 10*

20 parts of O:O-diethyl S-β-diethylaminoethyl phosphorothiolate,

19,000 parts of citric acid and 28,000 parts of disodium phosphate are dissolved in 1,000,000 parts water. The excess of citric acid and the phosphate are added as buffers.

*Example 11*

1 part of O:O'-diethyl S-β-diethylaminoethyl phosphorothiolate is dissolved in 1,000 parts of diacetone alcohol, $(CH_3)_2C(OH).CH_2.COCH_3$, to form a non-phytocidal plant spray.

*Example 12*

12 parts of O:O'-diethyl S-β-diethylaminoethyl phosphorothiolate dihydrogen citrate is intimately mixed with 10,000 parts of kieselguhr, and 90 parts of spindle oil to yield a non-dusting pulverulent composition.

*Example 13*

1 part of O:O'-diethyl S-β-piperidinoethyl phosphorothiolate or its oxalate, and 25 parts of sodium dinaphthylmethane disulphonate are dissolved in 25,000 parts of water. The resulting solution is suitable for use as a spray on plants which are difficult to wet.

*Example 14*

155 parts of O:O'-diethyl S-β-diethylaminoethyl phosphorothiolate are dissolved in 3,550 parts of dry ether and the solution cooled in ice and saturated with dry hydrogen chloride. The solvent and excess hydrogen chloride are then removed under reduced pressure below 30° C. and the residue of O:O'-diethyl S-β-diethylaminoethyl phosphorothiolate hydrochloride is isolated. This salt is readily soluble in water to form an agricultural spray.

What we claim is:

1. A pesticidal composition comprising an inert pesticide carrier and, as the active pesticidal ingredient, a phosphorothiolic acid ester of the general formula

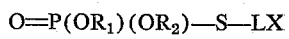

in which $R_1$ and $R_2$ stand for lower alkyl radicals, L stands for a member of the group consisting of divalent saturated aliphatic hydrocarbon radicals of up to four carbon atoms and divalent saturated aliphatic hydrocarbon radicals of up to four carbon atoms in which the carbon atoms are interrupted by Z, Z being an atom selected from the group consisting of oxygen, sulphur, and nitrogen carrying a lower alkyl substituent, and X stands for a member of the group consisting of secondary aliphatic amines, piperidine and morpholine attached to L through the amino nitrogen atom and salts thereof.

2. A pesticidal composition according to claim 1 wherein said ester is free from any hydrocarbon radical containing more than 4 carbon atoms.

3. A pesticidal composition according to claim 1 wherein said inert carrier is a liquid.

4. A pesticidal composition according to claim 3 wherein said liquid carrier is a non-phytocidal organic solvent for the ester.

5. A pesticidal composition according to claim 1 wherein said inert carrier is water.

6. A pesticidal composition according to claim 1 wherein said inert carrier is a solid.

7. A pesticidal composition according to claim 6 wherein said carrier is an inert pulverulent diluent selected from the group consisting of talc, kieselguhr, bentonite and powdered chalk.

8. A pesticidal composition according to claim 1 wherein said ester is selected from the group consisting of O:O'-diethyl, S-β-diethylaminoethyl phosphorothiolate, its p-toluene sulphonate, its hydrogen oxalate, its hydrochloride and its dihydrogen citrate, O:O'-diethyl S-1-diethylaminoprop-2-yl phosphorothiolate hydrogen oxalate, O:O'-diethyl S-β-piperidinoethyl phosphorothiolate hydrogen oxalate, O:O'-diethyl S-β-morpholinoethyl phosphorothiolate p-toluenesulphonate and O:O'-diethyl S-β-di-n-propylaminoethyl phosphorothiolate hydrogen oxalate.

9. The method of killing insects which comprises exposing the insects to a toxic quantity of a pesticidal composition according to claim 1.

References Cited in the file of this patent

FOREIGN PATENTS 1,073,791    France _____ Mar. 24, 1954

OTHER REFERENCES

Manufacture of Compressed Tablets, Silver, F. J. Stokes, 1944, p. 1.